Aug. 16, 1938.  A. B. SPYUT  2,126,932
TESTING DEVICE
Filed April 29, 1936  2 Sheets-Sheet 1
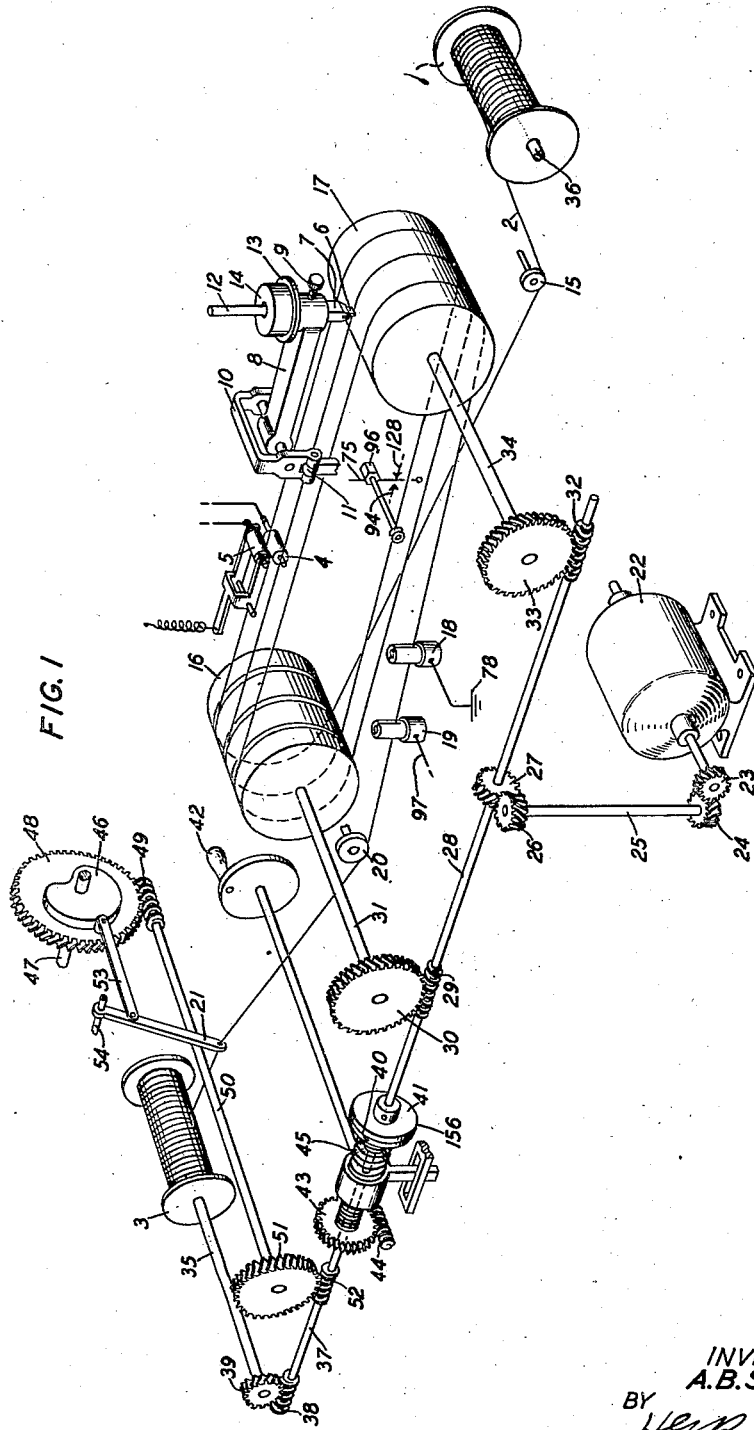
INVENTOR
A.B.SPYUT
BY
*H. T. Bandfield*
ATTORNEY

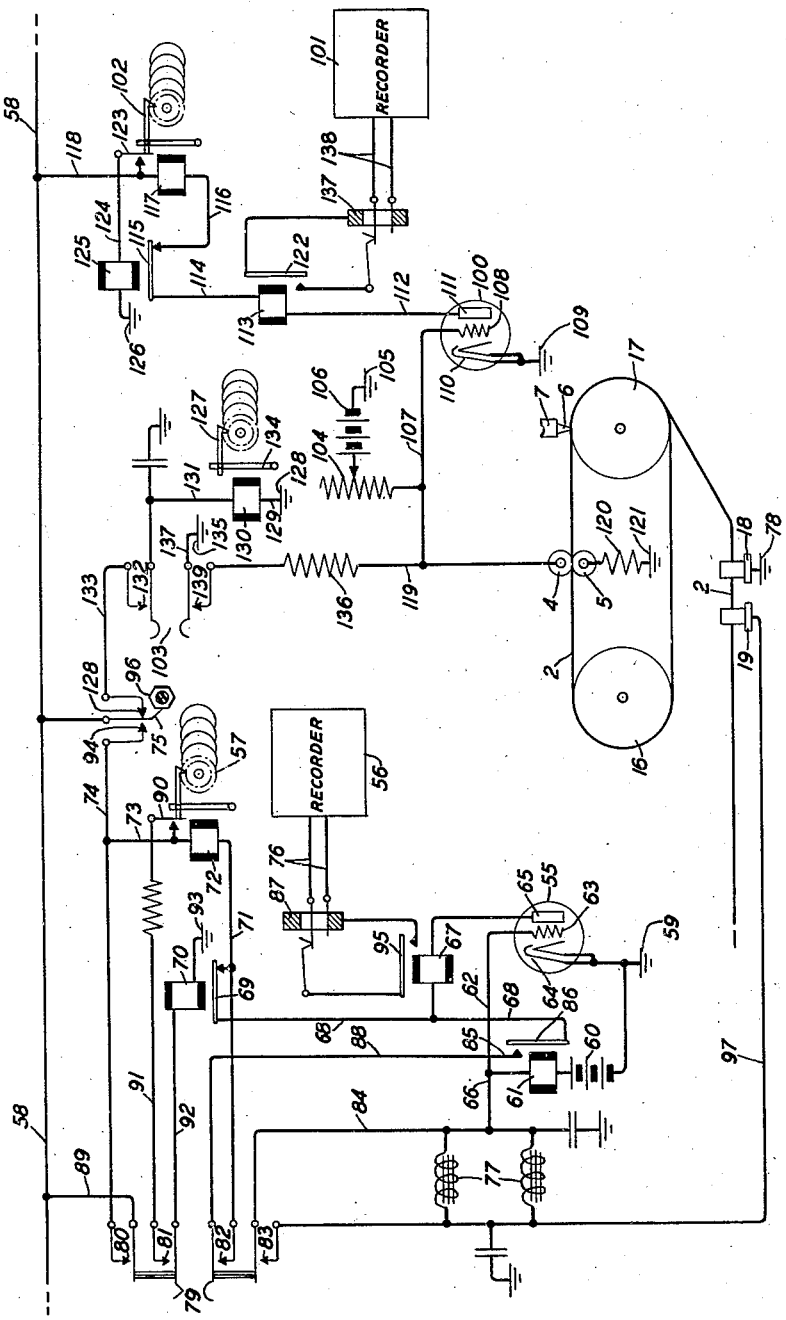

Patented Aug. 16, 1938

2,126,932

UNITED STATES PATENT OFFICE 2,126,932

TESTING DEVICE

Albert B. Spyut, Waltham, Mass., assignor to Bell Telephone Laboratories, Incorporated, New York, N. Y., a corporation of New York Application April 29, 1936, Serial No. 76,991

14 Claims. (Cl. 175—183)

This invention relates to testing devices and more particularly to a method and apparatus for testing and recording the characteristics of insulating coatings on wire.

Insulated wire in which a coating of material which is a non-conductor of electricity is applied to a wire requires careful inspection in order to determine discontinuities of the insulating coating and to indicate lack of adhesion between the coating and the wire. This is necessary in order to maintain a definite standard of the product and is particularly necessary in the case of enamel coated wire because of the relatively thin coatings used and the importance of adherence if the coating is to be maintained intact and serviceable. The hardness, adherence, and general resistance to abrasion of a sample of enameled wire have been determined by various tests but these tests in general give widely varying results. The continuity of the coating has been determined by running the wire through a mercury pool and recording the number of electrical contacts with the mercury. This method detected the bad spots, but gave no indication of hidden defects in the enamel. Several methods have been developed for determining the quality of enamel or lacquer coat on flat metal surfaces, but they are not, in general, applicable to testing the coat on the small cylindrical surface presented by an enameled wire.

An object, therefore, of this invention is an apparatus which will automatically determine the characteristics of considerable lengths of coated wire.

Another object of this invention is an apparatus which will indicate substantially simultaneously the adherence of the insulations to the wire as well as the uniformity of the insulating coating.

A further object is an apparatus which will indicate such defects per unit length of wire.

In accordance with the present invention these and other objects are attained by passing the wire through an apparatus in which the adherence of the wire is determined by scraping the coating with a scraper member. The wire is passed through the apparatus at a constant rate and the scraper member is held against the wire under a predetermined pressure in such a manner that substantially no tension is exerted on the wire. When a section of the wire having a poorly adhering coating passes the scraper it will be scraped off. After leaving the scraper the wire is passed across a pair of spaced apart contacts which are in circuit with electrically operated recorders. Thus, when a section of wire, the coating of which is scraped off for a distance greater than the distance between the spaced apart contacts passes between the contacts a circuit is closed and the recorders are actuated.

If desired, the actual adherence of the coating may be determined by increasing the pressure on the scraper until the coating is scraped off the wire. It has been found that the pressure required to scrape the wire bare provides a very good measure of the elasticity, hardness, and adherence of the coating, which together determine its ability to withstand the stretching, abrasion, and other abuse that it necessarily receives during manufacturing and coil winding operations.

The mechanism which tests the coating of the wire for uniformity comprises one or more pairs of rollers between which the wire is drawn. The wire is subjected to this test before it is given the scraper test. As the rollers pass over a pin hole, or other such defect an electrical circuit is completed through the wire under test and the rollers. The impulse over this circuit actuates a recording mechanism such as a numerical recorder or a register.

This apparatus also records the lengths of the wire under tests and indicates the faults per unit length.

The invention will be better understood from the following description and attached drawings, in which Fig. 1 is a schematic drawing of the wire testing machine, and Fig. 2 is a circuit diagram of the apparatus disclosed in Fig. 1.

As shown in Fig. 1, the supply spool 1 contains the wire 2, the coating of which is to be tested. A second spool 3 is a take-up spool upon which the wire is wound after being tested. The pair of conducting rollers 4 and 5 are the rollers for locating pin holes, rough spots and thin coated sections. These rollers may be held against the wire by any suitable means, for example, by spring means as disclosed. The scraper member 6 is held in place by member 7 which is fastened to arm 8 by thumb screw 9. The scraper is of any suitable substance either metal or mineral which is harder than the enameled coating. However, it has been found preferable to make the scraper of the mineral sapphire. Arm 8 is associated with hinge members 10 and 11, thereby permitting the scraper to be raised from the wire while the wire is being threaded through the machine. A spindle 12 and platform 13 serve to support the interchangeable weight 14 which exerts pressure on the scraper member. The smooth surface of drum 17 serves as means for holding the wire 2 against the scraper blade 6.

To operate the machine, spool 1 is placed on shaft 36 and the wire 2 is threaded through the machine. The wire is passed under a guide pulley 15 and around groove pulley 16, through the testing rollers 4 and 5, around flat drum 17, back to drum 16, under the scraper 6, again around drums 16 and 17, and then through a pair of mercury cup contacts 18 and 19, under guide pulley 20, through the hole in spacing arm 21 to take-up spool 3 on shaft 35. Each of the mercury contact cups 18 and 19 consists of a metal cup having its sides covered with a lining of rubber which extends above the metal sides. The sides of the lining are slit so that the wire may pass therethrough. Since the rubber fits tightly against the wire, no mercury will flow from the cup. The mecury is in contact with the metal cup to which terminals are connected.

Drums 16 and 17 are driven at the same rate by motor 22 which acts through its gears 23 and 24, shaft 25, gears 26 and 27, shaft 28, gears 29 and 30 and shaft 31; and gears 32 and 33 and shaft 34. Take-up spool 3 is also driven by motor 22, through clutch 156 which cooperates with shaft 28, shaft 37, gears 38 and 39, and shaft 35. The clutch 156 includes a pair of friction discs 40 and 41. Disc 40 is mounted on a portion of shaft 37 and disc 41 is mounted on driving shaft 28. Disc 40 may be moved into and out of frictional engagement with disc 41 by turning handle 42 in the proper direction. This rotates worm gear 44 and gear 43. These gears increase or decrease the pressure on spring 45 which is placed against disc 40 which is thereby held by the spring pressure against driving disc 41.

This pressure can be regulated so as to permit disc 40 to increase in slippage as the diameter of the take-up spool is enlarged by added turns of the tested wire.

The wire spacing mechanism for the take-up spool 3 consists of a cam 46 mounted on shaft 47 which is revolved by gears 48 and 49, shaft 50 and gears 51 and 52. An arm 53 follows the contour of cam 46 and moves arm 21 in which it is in engagement, back and forth. Arm 21 is pivoted at 54. The wire, which passes through a hole in arm 21, is therefore spaced back and forth across the take-up spool 3.

If desired, the gear arrangements on the drive shafts may be modified in accordance with well-known practices so that various rates of speed may be produced by using different gear combinations.

As shown in the drawings, the wire under test passes around the drums 16 and 17 three times and on the middle pass is engaged by the scraper 6. This passage of the wire around the drums before and after the scraping operation permits the wire to be scraped without substantial tension being exerted thereon. This gives a more accurate test of the adherence of the enamel coating than if the wire were pulled directly off the spool under the scraper in which case the coated wire would be under severe tension.

One of the principal advantages of this machine is that it tests the coating of the wire for practically all possible defects in one operation. The continuity of the coating on the wire is tested by the rollers and the adherence of the same section of the wire is then immediately determined by the scraper. Not only is the optimum adherence determinable by this machine, but the actual adherence of the enamel may be ascertained by increasing the pressure on the scraping member by placing additional weights on the platform 13 until the coating is scraped off. It has also been found that for certain kinds of enameling compounds very small variations in the baking temperature of the enamel coating can be determined by the scraper test. In fact, variations in temperature as small as those permitted by ordinary temperature control instruments have been detected.

A schematic view of the electrical circuit and associated recording apparatus for recording the number of scraped places caused by the scraper member is shown in Fig. 2. As shown in this drawing, the mercury cups 18 and 19 are connected in circuit with a space discharge tube 55, graphical recorder 56, numerical recorder or register 57 and a power line 58, one end of which of course is grounded. Tube 55 is of the trigger or gas-filled type, that is, one in which no plate current will flow until the potential of the grid has passed a certain critical negative value. The graphical recorder 56 may be of any suitable mechanism which will produce a graphical record of electrical impulses and, as shown in the drawings, its terminals 76 are plugged into socket 87. Numerical recorder 57 may also be of any suitable type known in the art which will operate by electrical impulses as for example the well-known type of register illustrated.

When a portion of wire 2 passing through the mercury cups 18 and 19 has been scraped free of insulation by member 6 for a distance as great as the distance between the mercury in the cups, the potential on the grid circuit becomes less negative since the negative side of battery 60 will then be grounded at 78 through mercury cup 18. This change in grid potential in tube 55 permits current to flow through the plate circuit which energizes relays 67 and 72. When relay 67 is energized it closes its contacts 95 which causes graphical recorder 56 to operate and to indicate on a graph that the scraping member 6 has located a section of enamel having poor adherence on the conductor. When relay 72 is energized, it actuates the registering mechanism 57 which gives a numerical count of the number of scraped portions made by the scraping member 6. The grid control circuit and plate circuit of tube 55 may be traced as follows: grid 63 is initially at the negative potential of battery 60 since it is connected to it through relay 61 and conductor 62. When the wire under test connects the two mercury cups in circuit, the negative side of battery 60 is grounded over a circuit which may be traced from ground 78, mercury cup 18, wire 2, mercury cup 19, conductor 97, retardation coil 77, conductor 66, through relay 61 to battery 60 the other side of which is grounded at 59. The plate circuit which operates the register 57 and the graphical recorder 56 may be traced from ground 59, cathode 64, plate 65, to relay 67, conductor 68, contact 69 of relay 70, conductors 71, relay 72, conductors 73 and 74, through contacts 94 and 75 of the cam switch 96 to power line 58, one side of which is grounded. The cam switch 96 is placed in the plate circuit so that the scraped portions per unit length may be determined. As shown in Figs. 1 and 2, the cam switch is composed of a contactor 75 and a hexagonal cam 96. This cam is arranged so that it opens its contact 94 once for each two-inch piece of wire passing through the machine. This permits a scrape count for each two-inch length. Although in Fig. 1 the cam 96 is shown being driven by a friction pulley which contacts the moving wire, it is of course obvious that various mechanical expedients may be employed to rotate this cam and that the cam may be made of various dimensions so that the contact 94 will be opened for different lengths of wire.

The actual length of the scraped portion of the wire may be recorded on the same recording devices by closing contacts 80, 81, 82, and 83 of key 79. This shunts out interrupting cam switch 96 and permits register 57 to operate but once during the total length of a scraped portion of the wire. This also shunts out retardation coil 77 and tends to further decrease the negative potential on the grid when a scraped portion of the wire makes a contact across the mercury cups. The grid potential of tube 55 is thus reduced by current flowing from ground 78, mercury cup 18 over the scraped portion of the wire 2, mercury cup 19, conductor 97, contact 83, conductor 84, through relay 61, battery 60 to ground 59. Since this current path is in shunt with retardation coil 77 more current from battery 60 can flow through relay 61. This increased current is sufficient to operate relay 61 which closes its contacts 85 and 86 and thereby establishes a portion of a new plate circuit as well as cooperating to open the first described plate circuit. With the decrease in grid potential, current again will flow through tube 55 over the plate circuit. This plate circuit, as just mentioned, is somewhat different from the plate current described supra. It may be traced from ground 59, cathode 64, plate 65, relay 67, conductor 68, through the now closed contacts 86 and 85 of relay 61, conductor 88, contact 82 of key 79, conductor 71 to relay 72, conductors 73 and 74, contacts 80 of key 79, conductor 89 to power line 58. The cam switch 96 is thus short-circuited and relay 72 is operated only once during the length of the scrape. Current flows over this plate circuit and operates relay 67 and relay 72. Relay 72 closes its contact 90 and establishes a circuit through relay 70 which may be traced from power line 58, conductor 89, contact 80 of key 79, conductor 74, conductor 73, contact 90 of relay 72, conductor 91, contact 81 of key 79, conductor 92 through relay 70 to ground 93. Relay 70 draws up its contact 69, thereby opening the former plate circuit through this contact. Relay 67 draws up its contacts 93 thereby actuating the recorder 56. This recorder, by means of a stylus cooperating with a moving chart, indicates graphically the actual length of the scraped portion passing through the mercury cups.

When the insulation on the wire under test is not scraped off by the scraping member, the contact between the mercury cups is broken and the original grid potential of tube 55 is reestablished. The plate circuit of tube 55 is thus prevented from continued operation and the relays controlling the operation of the graphical recorder and the register are deenergized. This series of operations will be repeated if key 79 is kept closed and a new portion of scraped wire makes contact between the mercury cups.

The circuit for recording the presence of pin holes, rough spots and thin spots in the enamel coating found by the roller test is also shown on Fig. 2. As shown on the right part of this drawing, the rollers 4 and 5 are connected in circuit with space discharge tube 100, graphical recorder 101, register 102, to a source of current 58. Key 103 and potentiometer 104 cooperate to set up a relay sensitivity adjustment circuit so that the recorders 101 and 102 may be adjusted to operate only at a desired potential change on the grid of tube 100. Tube 100 is of the same trigger type as tube 55 described above in connection with the circuit for the scraper mechanism, and no current will flow therethrough until the grid potential has passed below a certain critical negative potential value. The grid 108 is connected to one side of battery 106, through potentiometer 104 and conductor 107 to grid 108. The plate circuit over which current flow actuates the pin hole register 102 and also the graphical recorder 101 may be traced from ground 109, cathode 110, plate 111, conductor 112, relay 113, conductor 114, contact 115 of relay 125, conductor 116, relay 117, conductor 118 to power line 58.

When the insulation on the wire passing between the rollers 4 and 5 is of low resistance owing to the presence of pin holes, slivers, etc., current will flow between the rollers, and the negative potential on the grid will be reduced since battery 106 will be grounded over a circuit which may be traced from ground 105, battery 106, potentiometer 104, conductors 107 and 119, rollers 4, wire under test 2, rollers 5, resistance 120 to ground 121. The drop in negative potential permits current to flow through trigger tube 100 over the above described plate circuit which closes the contact 122 of relay 113 and actuates graphical recorder 101: and also closes the contact 123 of relay 117 and operates the register 102. The graphical recorder 101 plots a curve of the number of faults found by the rollers. The terminals 138 of the recorder 101 are inserted into plug 137. When contact 123 of relay 117 is closed, it permits current to flow from power line 58, conductor 118, contact 123, conductor 124, relay 125, to ground 126. This operates relay 125 which opens the plate circuit by drawing up its contact 115, and this opens the circuit through relay 117 which in turn releases its contact 123. If at this point the insulation on the wire passing between the rollers 4 and 5 is of the desired resistance, the shunt circuit through the battery 106 will be broken and the grid potential of the tube will be restored and no further plate current will flow. However, if the insulation of the wire passing between the rollers 4 and 5 continues to be of low resistance, the tube will continue to function through its plate circuit. In this case, the pair of relays 117 and 125 are again rapidly operated as each pin hole is found by the rollers. It will be seen that by the rapid operation of the relays 117 and 125, it is possible to record the number of pin holes which are close together as well as those farther apart on the register 102.

The length of the wire as measured in two-inch lengths, is recorded on the register 127. Cam switch 96, which closes its contact 128 each time a two-inch portion of the wire passes through the machine, completes a circuit from ground 128, conductor 129, relay 130, conductor 131, contact 132 of key 103, conductor 133, contact 128 to control 75 and power line 58. Relay 130 thus draws up its contact 134 and actuates register 127. It will be noted that this cam switch is the one which also actuates the scraper mechanism by closing its other contact 94.

The sensitivity of tube 100 is adjusted by an auxiliary circuit which includes resistance equal to that required for the wire insulation, and a potentiometer to adjust the potential of the grid so that the tube will function when the resistance of the wire falls below the predetermined resistance.

This auxiliary circuit may be traced from ground 135, conductor 137, through contact 139 of the other side of key 103, resistance 136, conductor 119, potentiometer 104, battery 106 to ground 105. When the key 103 is closed, the battery 106 will be grounded and the potential on the grid 108 will fall. If the tube 100 does not function to operate the relays 113, 117, and 125, when the resistance in the line falls below the predetermined resistance, the potentiometer 104 is adjusted until it will so function. At this point key 103 is closed on the other side and connects the length register 127 in the test circuit and cuts out the adjusting circuit.

It will be clear from Fig. 2 that if a scraped portion of wire 2 was passing through mercury cup 19 at the same time a pin hole was passing between the rollers 4 and 5 that the grid 63 of tube 55 would be grounded at 121 instead of over its normal path through mercury cup 18 to ground 78. Accordingly, in such a case a pin hole would actuate the recorders 56 and 57 and would register as a scraped portion of wire. This is prevented by placing resistance 120 between the rollers and the ground 121. This resistance reduces the current flow over the wire 2 under test sufficiently to prevent tube 55 from functioning.

While this invention is particularly adaptable to the testing of the characteristics of enameled wire, it is obvious that the characteristics of wire insulated with various other insulating compounds may be determined by its use.

What is claimed is:

1. The method of determining the characteristics of insulation on wire which consists in moving the wire at a constant rate, subjecting the moving wire to the action of a scraping member and automatically recording the number and extent of portions exposed by the scraping.

2. The method of determining the characteristics of insulation on wire which consists in moving the wire at a constant rate, subjecting the moving wire to the action of a scraping member without substantial tension being exerted on the wire, and automatically recording the number and extent of the portions exposed by the scraping.

3. In apparatus for testing the characteristics of insulating coatings on wire, means for moving the wire through the apparatus, means cooperating with said first means for scraping said insulating coating, and recording means for recording defects in the insulation found by said scraping means.

4. In apparatus for determining the characteristics of insulating coatings on wire, a drum for drawing the wire through the apparatus, means comprising a sapphire scraper member located at a tangent to said drum for scraping the insulating coating of the wire passing therearound, and means for recording the number and length of portions of the insulating coating removed by said scraper member.

5. In apparatus for testing the adherence of enamel coating on wire, means comprising a pair of synchronously driven drums for moving the wires at a constant rate through said apparatus, means comprising a scraping member cooperating with said drums to scrape the enamel coating without exerting substantial tension on said wire, and electrical means for indicating defects in enamel adherence found by said scraper.

6. In apparatus for testing the characteristics of coatings on wire, means for moving the wire through the apparatus, means cooperating therewith for scraping said coating and means comprising an electrical circuit for actuating a register when the defect in the coating found by the scraping means exceeds a predetermined length.

7. In apparatus for testing the characteristics of coatings on wire, means for moving the wire through the apparatus, means cooperating therewith for scraping said coating and means comprising an electrical circuit including said scraped wire for actuating a graphical recorder to indicate the length of the scraped portion of the wire.

8. The method of determining the characteristics of insulation on wire which consists in passing the wire around a pair of spaced apart synchronously driven drums a plurality of times thereby moving the wire without substantial tension being exerted thereon, subjecting the insulated wire after its first pasage around the drums to the action of a scraping member, and recording defects in insulation adherence located by said scraping member by electrically actuated recorders.

9. In apparatus for testing the characteristics of insulating coatings on wire, means for moving the wire through the apparatus comprising a pair of synchronously driven drums, a scraping member located adjacent one of said drums for frictionally engaging a strand of wire passing therearound, and means associated with said scraping member for raising it out of contact with said wire.

10. In apparatus for testing the characteristics of insulating coatings on wire, a scraping member for testing the adherence of the insulation on the wire, contact means for engaging said insulating coating subsequent to its engagement with said scraping member, a registering mechanism, a control circuit including said contact means and predetermined lengths of wire devoid of insulation, a second circuit controlled by said first circuit to operate said registering means, and means in said second circuit for subsequently opening said second circuit when a predetermined length of wire has passed through said apparatus.

11. In apparatus for testing the characteristics of insulating coatings on wire, means for moving the wire through the apparatus at a constant rate, means cooperating with said first means for scraping said insulation and for removing poorly adhering sections from said wire, contact means for engaging said wire subsequent to its passage through said scraping means, a recording mechanism, a control circuit including said contact means and predetermined lengths of wire devoid of insulation, a second circuit controlled by said first circuit to operate said recording means, and means in said second circuit for subsequently opening said second circuit when a predetermined length of wire has passed through said apparatus.

12. In apparatus for testing the characteristics of insulating coatings on wire, a scraping member for testing the adherence of the insulation on the wire, contact means for engaging said insulating coating subsequent to its engagement with said scraping member, a numerical registering mechanism, a graphical recording mechanism, a control circuit including said contact means and predetermined lengths of wire devoid of insulation, a second circuit controlled by said first circuit to operate said registering means, and means in said second circut for subsequently opening said second circuit when a predetermined length of wire has passed through said apparatus.

13. In apparatus for testing the electrical conductivity and the adherence of enamel on enameled wire, contact means comprising rollers in contact with the wire, an electrical control circuit including said contact rollers and said wire, a second circuit controlled by said control circuit and having associated therewith means for recording flow of current therein and for opening said second circuit, a member for scraping said enamel to determine its adherence to said wire, additional contact means engaging the wire subsequent to its engagement with said scraping member, a second control circuit including said last mentioned contact means and predetermined lengths of wire devoid of enamel, a second recording mechanism, another circuit controlled by the second control circuit to operate said second recording mechanism, means in said controlled circuit for subsequently opening said controlled circuit when a predetermined length of wire has passed through said apparatus, and means in said first control circuit to prevent current flow in said second control circuit.

14. In apparatus for testing the characteristics of insulation on wire, means for electrically indicating the continuity of the insulation, means for electrically indicating the adherence of the insulation to the wire, and additional means to prevent the operation of one of said means from affecting the operation of the other of said means.

ALBERT B. SPYUT.